June 26, 1928.

C. W. DAKE 1,675,305

DISTRIBUTION VALVE FOR STEAM ENGINES AND THE LIKE

Filed Oct. 15, 1926    3 Sheets-Sheet 1

INVENTOR
Charles W. Dake
BY
Parks & Carter
ATTORNEY

June 26, 1928.

C. W. DAKE 1,675,305

DISTRIBUTION VALVE FOR STEAM ENGINES AND THE LIKE

Filed Oct. 15, 1926     3 Sheets-Sheet 2

INVENTOR
Charles W. Dake
BY
Parks & Carls
ATTORNEY

June 26, 1928.　　　　　　　　　　　　　　　1,675,305
C. W. DAKE
DISTRIBUTION VALVE FOR STEAM ENGINES AND THE LIKE
Filed Oct. 15, 1926　　　　3 Sheets-Sheet 3
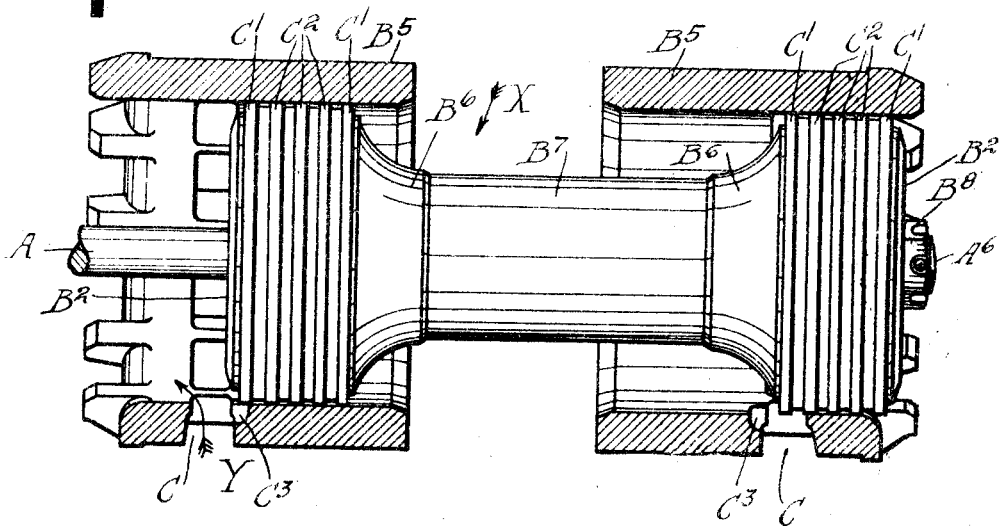
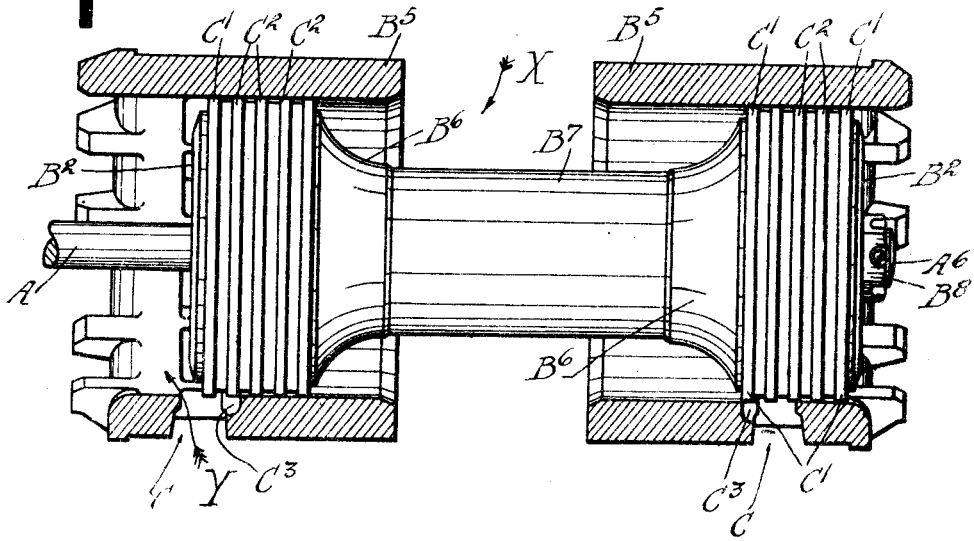
INVENTOR
Charles W. Dake
BY
ATTORNEY Patented June 26, 1928.

1,675,305

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

DISTRIBUTION VALVE FOR STEAM ENGINES AND THE LIKE

Application filed October 15, 1926. Serial No. 141,766.

My invention relates to improvements in distribution valves for steam engines and the like and has particular reference to what is called a duplex valve, that is,—a valve wherein the time at which the major part of the working supply of steam is fed into the cylinder, is different from the time when a certain smaller part of the working supply is fed and wherein a moving valve element in cooperation with the valve port accomplishes this double time control.

I provide in connection with the moving valve element an auxiliary port or passage through the valve seat extending behind the cut off face of the valve. This small port or passage allows steam to enter the cylinder after the main valve part has closed the port. This gives in general the same effect as a change in the valve control, and makes it possible to start heavier loads and to carry heavier loads at low speeds than is otherwise the case and becomes altogether inoperative when the speeds are high because the little auxiliary port or passage is so small that at high speeds it exerts a negligible and indistinguishable effect. This makes it possible to get the most satisfactory engine operating conditions without the necessity of long valve travel or complicated valve gearing. The advantage of eliminating complicated valve gearing is obvious, the advantage of eliminating long valve travel is that lubrication difficulties become very serious when the high valve piston speeds required to permit long valve travel are used.

My invention is illustrated more or less diagrammatically in the accompanying drawings, wherein—

Figure 4 is a section similar to Figure 1 showing the valve in the open position;

Figure 5 is a similar section showing the valve in elevation in an intermediate position.

Like parts are indicated by like characters throughout the specification and drawings.

Figure 1:
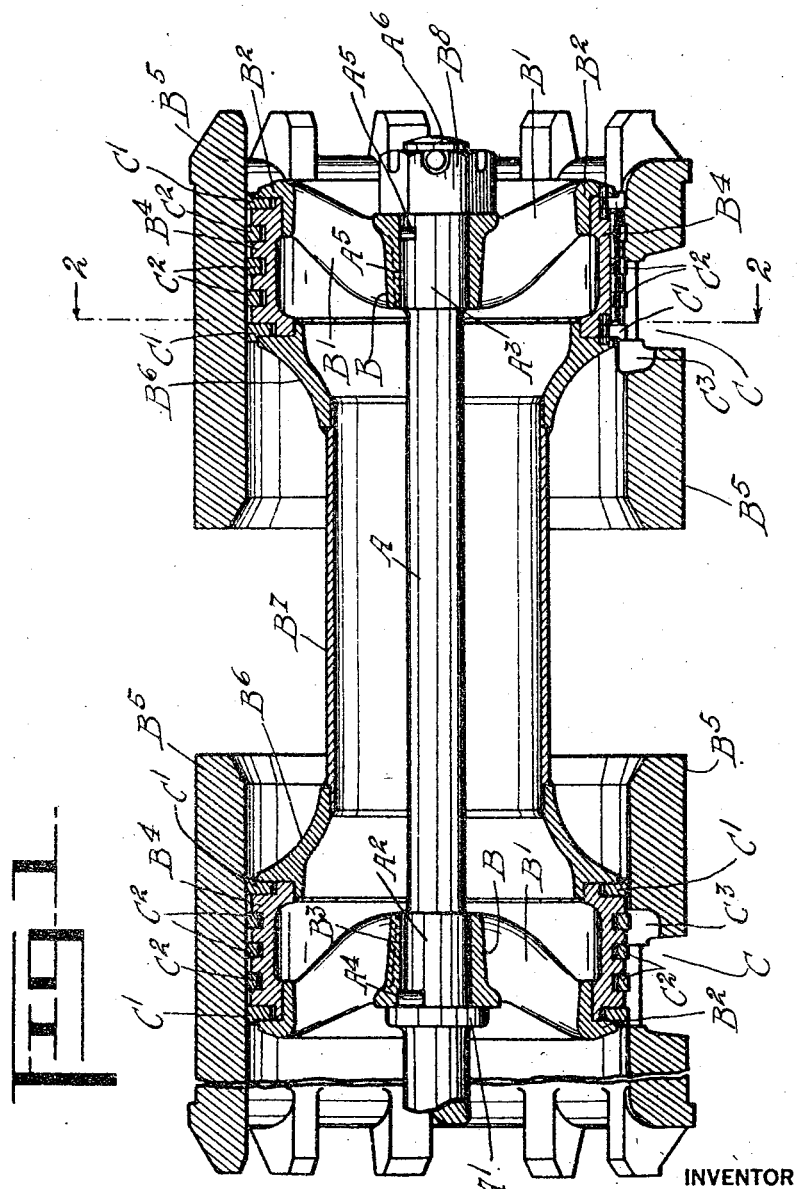
Figure 1 is a longitudinal section through a steam engine piston valve and seat embodying my invention.
Figure 2:
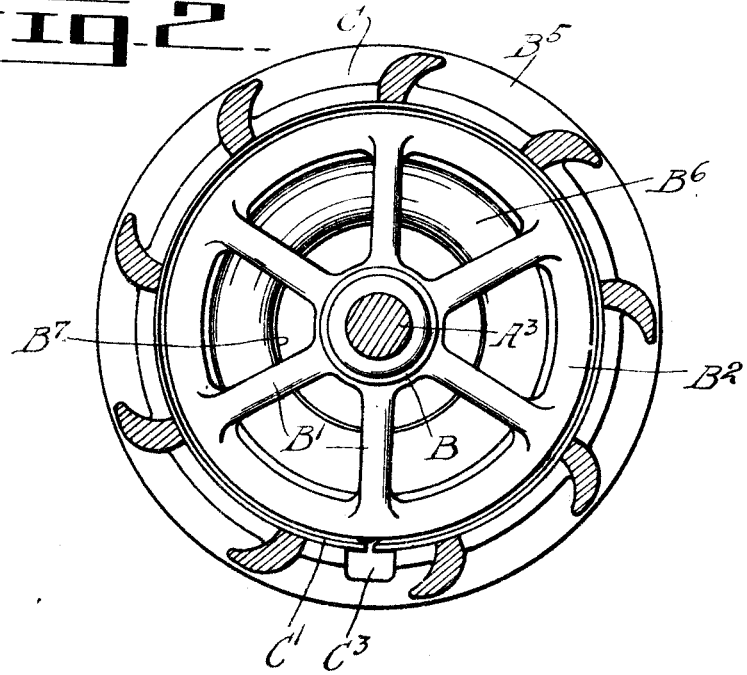
Figure 2 is a section along the line 2—2 of Figure 1.
Figure 3:
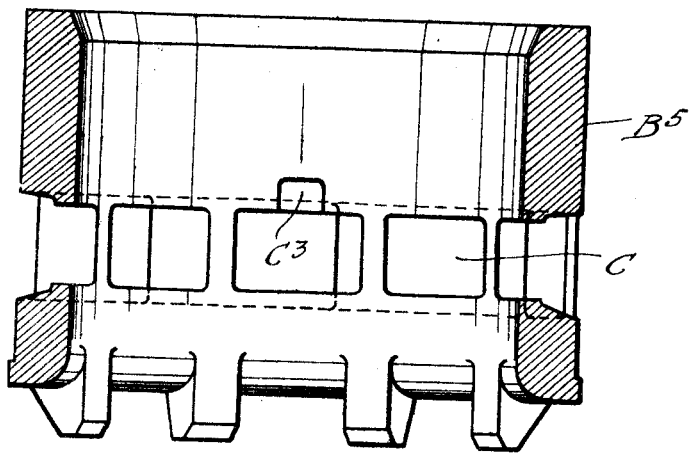
Figure 3 is a section through the valve seat.

A is a valve stem flanged at $A^1$ and having enlarged bearing surfaces $A^2$ adjacent the flange $A^1$ and $A^3$ adjacent the end of the stem. $A^4$ is a lock pin projecting from the bearing surface $A^2$. The rod A is reduced at $A^6$ at the bearing surface $A^3$ and there threaded.

The two piston heads, there being one at each end adapted to fit upon the bearing members $A^2$ $A^3$ comprise hubs B, spokes $B^1$, and flange rims $B^2$. These heads are opposed as indicated with the flanges at the end of the pistons. The hubs B both having longitudinal keyways $B^3$ and one of the hubs B is cut away to engage the pin $A^4$ where it seats upon the flange $A^1$. The keyway of the other hub fits the pin $A^5$; thus the two hubs are held against rotation with respect to the valve stem. Carried by the flange rims $B^2$ are cylindrical working members $B^4$. These members located one at either end of the valve, travel along and engage the valve cylinder, sleeve or bushings $B^5$. They are engaged along their sides removed from the flange wheel by conical filler members $B^6$ which in turn are separated by the cylindrical valve body $B^7$. The nut $B^8$ when screwed up on the threaded end of the stem compresses the separate elements above referred to comprising the valve, against the flange $A^1$ and the pressure of the nut holds all the parts together.

The sleeves $B^5$ are ported at C, these ports being adapted to be controlled by the working valve elements which are so disposed that the rings $C^1$ form the main cut off edges of the valve. The outer peripheries of the members $B^4$ contain other packing rings $C^2$ $C^2$ all of which are in frictional contact with the sleeves $B^5$ and prevent steam leakage. $C^3$ is a port extending through the valve seat so that steam may pass from the space surrounding the cylinder body $B^7$ into the port and thence to the engine cylinder, even when the major portion of the ports are closed by the working part of the piston. The boundary of the port $C^3$ farthest removed from the port C forms the auxiliary cut off edge of the valve. The steam, of course, enters the valve cylinder in the direction shown by the arrow X and the exhaust leaves it in the direction of the arrow Y in Figure 4. The parts are shown with the steam leading to the right hand end of the engine cylinder completely cut off and the passage $C^3$ is closed. The ports leading to the left hand end of the engine cylinder are slightly open for the commencement of the exhaust. In Figure 5, the exhaust is wider open, the port C is not yet open but a small amount of steam is allowed to pass in through the passage $C^3$. This gives an early opening for the steam. Further movement of the valve toward the right would result in wider opening of the exhaust at the left end and full opening of the steam passage at the right hand end. As the valve returns back toward the position shown in Figure 5, the steam will be cut off but a small amount of steam will still pass in toward the end of the stroke so that a small additional quantity of steam is allowed to enter at the two ends of the stroke when it is especially needed at low speeds. Obviously if the speeds are great, the time during which any steam will pass through the auxiliary passage is so slight that the amount of steam which can pass in will be so slight in proportion to the amount of steam normally passing that the effect of this auxiliary passage will be greatly minimized and to all practical purposes eliminated, but at low speeds when valve movement is relatively slow the effect of this advance opening and retarded final closing of the steam supply will be to give a longer time during which steam is fed to the working end of the cylinder, thus enabling the engine to carry heavier loads at lower speeds.

I claim:

A distribution valve for steam engines comprising a piston having enlarged ends, a ported valve bushing in which the piston reciprocates, packing rings in each enlarged end traversing the ports, one of the rings in each end forming a main cut off edge, channels one associated with each enlarged end, extending along the inner periphery of the bushing, from the ports in the direction which the piston travels to cut off steam, the cut off edge forming, packing ring being adapted to travel the length of the channel, and when it reaches the end thereof to act as an auxiliary cut off edge.

Signed at Chicago county of Cook and State of Illinois, this 13th day of October, 1926.

CHARLES W. DAKE.